United States Patent Office 3,455,945
Patented July 15, 1969

3,455,945
4-[CARBOXY (AND CARBO-LOWER ALKOXY) PHENYL]-1,4-DIHYDROPYRIDINES
Bernard Loev, Broomall, Pa., assignor to Smith Kline & French Laboratories, Philadelphia, Pa., a corporation of Pennsylvania
No Drawing. Filed June 7, 1967, Ser. No. 644,091
Int. Cl. C07d 31/34, 31/44; A61k 27/00
U.S. Cl. 260—295.5                                2 Claims

ABSTRACT OF THE DISCLOSURE 1,4-dihydropyridines having a carboxy (or carbo-lower alkoxy)phenyl group in the 4-position are prepared by reacting a formylbenzoic acid or lower alkyl ester thereof with two equivalents of a keto compound and ammonia, with two equivalents of an unsaturated amino compound or with one equivalent of a keto compound and one equivalent of an unsaturated amino compound. The compounds have hypotensive activity.

This invention relates to new 4-[carboxyl (and carbo-lower alkoxy)phenyl]-1,4-dihydropyridines having pharmacodynamic activity, in particular, hypotensive activity. For example, hypotensive activity is demonstrated on oral administration to neurogenic hypertensive dogs at doses of 10 to 40 mg./kg.

The new compounds of this invention are represented by the following formula:

Formula I

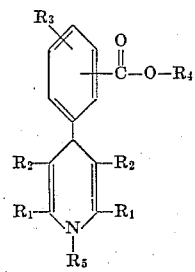

in which:

$R_1$ is lower alkyl having 1–6 carbon atoms;
$R_2$ is COOR' or COR";
$R_3$ is hydrogen, halogen, lower alkyl, lower alkoxy or trifluoromethyl, said lower alkyl and lower alkoxy groups each having 1–4 carbon atoms;
$R_4$ is hydrogen or lower alkyl having 1–4 carbon atoms;
$R_5$ is hydrogen or lower alkyl having 1–6 carbon atoms;
$R'$ and $R''$ are lower alkyl having 1–6 carbon atoms.

Also included in this invention are nontoxic, pharmaceutically acceptable carboxylic acid salts of the compounds of Formula I when $R_4$ is hydrogen. These salts are prepared by reacting a 4-carboxyphenyl compound with an inorganic or organic base such as an alkali metal hydroxide, for example, sodium or potassium hydroxide, ammonia or benzylamine.

Preferred compounds of this invention are represented by Formula I when $R_1$ is methyl; $R_2$ is carbomethoxy or carboethoxy and $R_3$, $R_4$ and $R_5$ are hydrogen.

The compounds of Formula I in which $R_5$ is hydrogen are prepared by the following procedures:

I
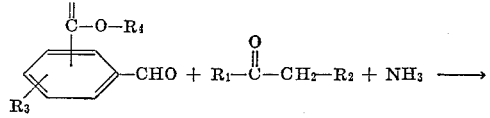

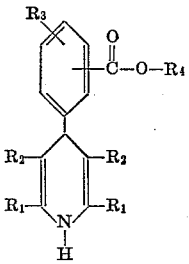

II
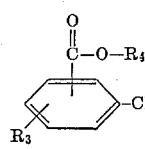

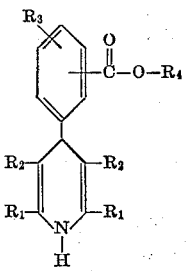

The terms $R_1$, $R_2$, $R_3$ and $R_4$ are as defined above.

According to procedure I, one molar equivalent of the formylbenzoic acid or lower alkyl ester thereof is reacted with two molar equivalents of the keto compound and an excess of ammonia. The reaction is preferably carried out in a solvent, such as a lower alkanol or dioxane, at elevated temperature, conveniently at reflux temperature for about 1 to 14 hours.

According to procedure II, one molar equivalent of the formylbenzoic acid or lower alkyl ester thereof is reacted with two molar equivalents of the unsaturated amino compound. Preferably, the reaction is carried out in a solvent, such as a lower alkanol or dioxane, at elevated temperature, conveniently at reflux temperature.

Also, compounds of Formula I in which $R_5$ is hydrogen are prepared by reacting one molar equivalent of the formylbenzoic acid or lower alkyl ester thereof with one molar equivalent of the keto compound used in procedure I and one molar equivalent of the unsaturated amino compound used in procedure II.

Advantageously, to prepare the 4-(carboxyphenyl)-dihydropyridines of this invention a lower alkyl ester of a formylbenzoic acid is used in the above procedures and the resulting 4-(carbo-lower alkoxyphenyl)-dihydropyridine is treated with an alkali solution, such as sodium hydroxide in an aqueous-lower alkanol solution, to hydrolyze the carbo-lower alkoxy group to the carboxy group.

Compounds of Formula I in which $R_5$ is lower alkyl are prepared from the corresponding compounds in which $R_5$ is hydrogen by oxidizing with an oxidizing agent such as a nitrous oxide, nitrous acid, hydroxylamine, hydrogen peroxide, oxygen or the like, then quaternizing using a suitable alkyl ester such as methyl iodide, ethyl sulfate, butyl methane sulfonate and the like and then reducing the resulting quaternary salt by using a chemical reducing agent such as sulfur dioxide or sodium hydrosulfite to give principally the 1,4-dihydropyridine or sodium borohydride to give principally the 1,2-dihydropyridine.

Although the dihydropyridines of this invention are drawn as having the 1,4-dihydro structure, the positions of the double bonds are not known with certainty in all instances and thus it is understood that some of these compounds may have the following 1,2-dihydropyridine structures:

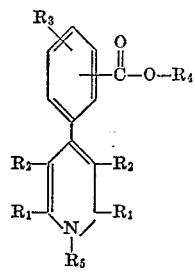

The formylbenzoic acid starting materials are either known to the art or are prepared as follows.

The formylbenzoic acids are prepared by known procedures, for example, by diazotizing the corresponding aminobenzoic acid and then treating with formaldoxime or, when $R_3$ is other than lower alkyl, by oxidizing a methylbenzoic acid with an oxidizing agent such as chromium trioxide, chromyl chloride or selenium dioxide.

The compounds of this invention may be administered internally in conventional dosage forms, such as tablets, capsules, injectables and the like, by incorporating an appropriate dose of the compound with pharmaceutical carriers according to accepted pharmaceutical practices.

The following examples are not limiting but are illustrative of this invention.

Example 1

To 15 g. of p-formylbenzoic acid in 120 ml. of ethanol is added 26 g. of ethyl acetoacetate and 17.5 ml. of aqueous ammonium hydroxide solution. The mixture is heated at reflux for about four hours, then poured onto ice and dilute hydrochloric acid and extracted with dichloromethane. The extract is concentrated, rinsed several times with hexane, then stirred with isopropyl ether. The solid material is filtered off and recrystallized from ethyl acetate-petroleum ether to give 3,5-dicarbethoxy-4-(4-carboxyphenyl)-1,4-dihydro-2,6-dimethylpyridine.

Two grams of the above prepared compound in ethanol is treated with 1 ml. of 40% sodium hydroxide solution to give, after concentrating in vacuo to a small volume and filtering, the sodium salt of 3,5-dicarbethoxy-4-(4-carboxyphenyl)-1,4-dihydro-2,6-dimethylpyridine.

Similarly, treating 3,5-dicarbethoxy-4-(4-carboxyphenyl)-1,4-dihydro-2,6-dimethylpyridine, which is suspended in water, with an excess of concentrated aqueous ammonium hydroxide gives the ammonium salt.

Example 2

Ethyl acetoacetate (26 g.) and 17.5 ml. of concentrated aqueous ammonium hydroxide solution are added to 16.4 g. of methyl p-formylbenzoate in 125 ml. of ethanol and the resulting mixture is heated at reflux for five hours. The mixture is then poured onto ice. Extracting with methylene chloride, then concentrating the extract, adding isopropyl ether to the residue and filtering gives 3,5-dicarbethoxy-4-(4-carbomethoxyphenyl)-1,4-dihydro - 2,6 - dimethylpyridine.

By the same procedure using, in place of methyl p-formylbenzoate, 17.8 g. of ethyl p-formylbenzoate and 20.6 g. of butyl p-formylbenzoate the products are 3,5-dicarbethoxy-4-(4-carbethoxyphenyl) - 1,4 - dihydro-2,6-dimethylpyridine and 3,5-dicarbethoxy-4(4-carbobutoxyphenyl)-1,4-dihydro-2,6-dimethylpyridine, respectively.

Example 3

By the procedure of Example 1 using, in place of ethyl acetoacetate, 23.2 g. of methyl acetoacetate, the product is 3,5-dicarbomethoxy-4-(4-carboxyphenyl)-1,4 - dihydro-2,6-dimethylpyridine.

Similarly, using 31.6 g. of t-butyl acetoacetate, the product is 3,5-dicarbo-t-butoxy-4-(4-carboxyphenyl)-1,4-dihydro-2,6-dimethylpyridine.

To a solution of 2.0 g. of 3,5-dicarbo-t-butoxy-4-(4-carboxyphenyl)-1,4-dihydro-2,6-dimethylpyridine in ethyl acetate is carefully added benzylamine until no more precipitate forms. The solid is filtered off and recrystallized from ethanol-isopropyl ether to give the benzylamine salt of 3,5-dicarbo-t-butoxy-4-(4-carboxyphenyl)-1,4-dihydro-2,6-dimethylpyridine.

Example 4

Sodium nitrite (20 g.) is added portionwise with stirring to a mixture of 18.7 g. of 3,5-dicarbethoxy-4-(4-carboxyphenyl)-1,4-dihydro-2,6-dimethylpyridine (prepared as in Example 1) in 250 ml. of acetic acid. The resulting mixture is heated until the evolution of nitrogen oxide fumes ceases, then is poured into 1.5 l. of water. The oil which separates is extracted with ether. The extract is rinsed with water, then dried and concentrated to give 3,5 - dicarbethoxy - 4 - (4-carboxyphenyl)-2,6-dimethylpyridine.

A mixture of 9.0 g. of the above prepared pyridine and 7.6 g. of dimethyl sulfate is heated on a steam bath for 15 hours. The mixture is cooled, stirred with ether and filtered to give the corresponding N-methyl pyridinium sulfate.

Five grams of the above prepared quaternary salt in a concentrated aqueous solution is added to a solution of 12 g. of sodium hydrosulfite and 15 g. of sodium carbonate in 100 ml. of water. The mixture is stirred under nitrogen for two hours. The mixture is extracted with ether, washed with water, dried and concentrated. The residue is recrystallized from methanol to give 3,5-dicarbethoxy-4-(4-carboxyphenyl)-1,4 - dihydro - 1,2,6-trimethylpyridine.

Dissolving 5 g. of the N-methyl pyridinium sulfate, prepared as described above, in 50 ml. of 40% ethanol, adding 5 g. of sodium carbonate and 1 g. of sodium borohydride gives a mixture containing 3,5-dicarbethoxy-4 - (4 - carboxyphenyl) - 1,4 - dihydro - 1,2,6 - trimethylpyridine and, principally, the corresponding 1,2-dihydro compound.

Similarly, using in place of dimethyl sulfate, 6.5 g. of ethyl bromide, 7.4 g. of n-propyl bromide or 8.2 g. of n-butyl bromide in the above procedure using sodium hydrosulfite to reduce the quaternary salt, the following products, respectively, are obtained:

3,5 - dicarbethoxy - 4 - (4 - carboxyphenyl - 1 - ethyl-1,4-dihydro-2,6-dimethylpyridine, 3,5 - dicarbethoxy - 4 - (4 - carboxyphenyl) - 1,4 - dihydro-2,6-dimethyl-1-(n-propyl)pyridine, and 1 - (n - butyl) - 4 - (4 - carboxyphenyl) - 3,5 - dicarbethoxy-1,4-dihydro-2,6-dimethylpyridine.

Example 5

According to the procedure of Example 1 using 28.8 g. of ethyl 3-oxovalerate in place of ethyl acetoacetate, the product is 3,5-dicarbethoxy-4-(4-carboxyphenyl)-2,6-diethyl-1,4-dihydropyridine.

In the same manner using 31.6 g. of methyl 3-oxo-heptanoate, the product is 2,6-di(n-butyl)-3,5-dicarbomethoxy-4-(4-carboxyphenyl)-1,4-dihydropyridine.

Example 6

Twenty grams of 2,4-pentanedione and 17.5 ml. of ammonium hydroxide are added to 15 g. of p-formylbenzoic acid in 120 ml. of ethanol and the resulting mixture is heated at reflux for five hours, then poured onto ice and dilute hydrochloric acid. The precipitated solid is filtered off and recrystallized from ethanol-isopropyl ether to give 3,5-diacetyl-4-(4-carboxyphenyl)-1,4-dihydro-2,6-dimethylpyridine.

Using 2,4-octanedione in the above procedure, the product is a mixture of 4-(4-carboxyphenyl)-1,4-dihydro-2,6-dimethyl-3,5-divalerylpyridine and 3,5-diacetyl-2,6-dibutyl-4-(4-carboxyphenyl)-1,4-dihydropyridine.

Example 7

By the procedure of Example 2 using in place of methyl p-formylbenzoate the following:

methyl 2-bromo-4-formylbenzoate
methyl 3-bromo-4-formylbenzoate
methyl 4-formyl-2-methoxybenzoate the products are, respectively:

4 - (3 - bromo - 4 - carbomethoxyphenyl) - 3,5 - dicarbethoxy-1,4-dihydro-2,6-dimethylpyridine
4 - (2 - bromo - 4 - carbomethoxyphenyl) - 3,5 - dicarbethoxy-1,4-dihydro-2,6-dimethylpyridine
3,5 - dicarbethoxy - 4 - (4 - carbomethoxy - 3 - methoxyphenyl)-1,4-dihydro-2,6-dimethylpyridine.

Heating each of the above prepared 4-carbomethoxyphenyl compounds with an excess of sodium hydroxide in aqueous ethanol, on a steam bath for six hours, then distilling off the ethanol and acidifying the remaining solution with hydrochloric acid gives the following products, respectively:

4 - (3 - bromo - 4 - carboxyphenyl) - 3,5 - dicarbethoxy-1,4-dihydro-2,6-dimethylpyridine
4 - (2 - bromo - 4 - carboxyphenyl) - 3,5 - dicarbethoxy-1,4-dihydro-2,6-dimethylpyridine
3,5 - dicarbethoxy - 4 - (4 - carboxy - 3 - methoxyphenyl)-1,4-dihydro-2,6-dimethylpyridine.

Example 8

Ethyl acetoacetate (13 g.) and 8 ml. of aqueous ammonium hydroxide solution are added to 7.5 g. of o-formylbenzoic acid in 75 ml. of ethanol. The mixture is heated at reflux for five hours, then poured onto ice and dilute hydrochloric acid. The mixture is extracted with dichloromethane and the extract is concentrated and washed with hexane. Isopropyl ether is added and the solid material is filtered off and dissolved in ethyl acetate. Adding hexane and filtering gives 3,5-dicarbethoxy-4-(2-carboxyphenyl)-1,4-dihydro-2,6-dimethylpyridine.

By the same procedure using 5-chloro-2-formylbenzoic acid, the product is 3,5-dicarbethoxy-4-(4-chloro-2-carboxyphenyl)-1,4-dihydro-2,6-dimethylpyridine.

Similarly, using 2-formyl-5-methoxybenzoic acid, the product is 3,5-dicarbethoxy-4-(2-carboxy-4-methoxyphenyl)-1,4-dihydro-2,6-dimethylpyridine.

Example 9

Ethyl acetoacetate (26 g.) and 17.5 ml. of aqueous ammonium hydroxide are added to 16.4 g. of methyl o-formylbenzoate in 100 ml. of ethanol. The resulting mixture is heated at reflux for five hours, then worked up as in Example 2 to give 3,5-dicarbethoxy-4-(3-carbomethoxyphenyl)-1,4-dihydro-2,6-dimethylpyridine.

Example 10

A solution of 2-methyl-4-carbethoxybenzenediazonium chloride, prepared by treating 54 g. of ethyl 4-amino-3-methylbenzoate, 57 ml. of concentrated hydrochloric acid, 50 ml. of water and 100 g. of ice with 17.5 g. of sodium nitrite in 25 ml. water at 0–5° C., is made neutral to Congo red by addition of sodium acetate. The solution is then added to a solution of 18 g. of formaldoxime, 6.3 g. of copper sulfate, 1 g. of sodium sulfite and 16.5 g. of sodium acetate in 180 ml. of water at 10–15° C. After one hour, the solution is made strongly acidic with hydrochloric acid, then refluxed for two hours. The mixture is cooled and extracted with ether. The ethereal extract is washed with aqueous sodium bicarbonate and dried. The solvent is removed in vacuo and the residue is distilled to give ethyl 4-formyl-3-methylbenzoate.

Following the procedure of Example 2 using 19.2 g. of ethyl 4-formyl-3-methylbenzoate in place of methyl p-formylbenzoate, the product is 3,5-dicarbethoxy-4-(4-carbethoxy - 2 - methylphenyl) - 1,4 - dihydro - 2,6 - dimethylpyridine.

A mixture of 3 g. of the above prepared dihydropyridine and 3 g. of sodium hydroxide in 50 ml. of aqueous ethanol is stirred at 50° C. for eight hours, then concentrated to dryness, stirred with water, treated with dilute hydrochloric acid and filtered to give 3,5-dicarbethoxy-4-(4 - carboxy - 2 - methylphenyl) - 1,4 - dihydro - 2,6 - dimethylpyridine.

Example 11

By the procedure of Example 10, ethyl 4-amino-3-trifluoromethylbenzoate (prepared by dissolving 4-amino-3-trifluoromethylbenzoic acid in ethanol, passing gaseous hydrogen chloride into the solution for eight hours, then concentrating in vacuo, dissolving in water, neutralizing with sodium carbonate, extracting with methylene chloride and removing the solvent from extract) is converted to ethyl 4-formyl-3-trifluoromethylbenzoate.

According to the procedure of Example 2 using ethyl 4-formyl-3-trifluoromethylbenzoate in place of methyl p-formylbenzoate, the product is 3,5-dicarbethoxy-4-(4-carbethoxy - 2 - trifluoromethylphenyl) - 1,4 - dihydro-2,6-dimethylpyridine.

What is claimed is:

1. A compound of the formula:

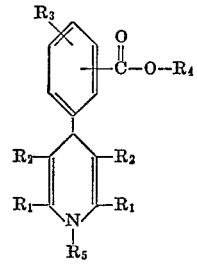

in which:

$R_1$ is lower alkyl having 1–6 carbon atoms;
$R_2$ is COOR' or COR'';
$R_3$ is hydrogen, halogen, lower alkyl, lower alkoxy or trifluoromethyl, said lower alkyl and lower alkoxy groups each having 1–4 carbon atoms;
$R_4$ is hydrogen or lower alkyl having 1–4 carbon atoms;
$R_5$ is hydrogen or lower alkyl having 1–6 carbon atoms;
R' and R'' are lower alkyl having 1–6 carbon atoms or when $R_4$ is hydrogen, a pharmaceutically acceptable carboxylic acid salt thereof.

2. A compound according to claim 1 in which $R_1$ is methyl, $R_2$ is $COOCH_2CH_3$ and $R_3$, $R_4$ and $R_5$ are hydrogen.

References Cited

UNITED STATES PATENTS 3,325,505  6/1967  Loev _____ 260—295.5

OTHER REFERENCES

Kametani et al., Chemical Abstracts, vol. 65, par. 20092-h to 20093-f, Dec. (1966).

HENRY R. JILES, Primary Examiner
ALAN L. ROTMAN, Assistant Examiner

U.S. Cl. X.R.

260—295, 473, 482, 483, 999